United States Patent [19]

Daly et al.

[11] Patent Number: 4,619,534

[45] Date of Patent: Oct. 28, 1986

[54] ROLLER CUTTER DRILL BIT HAVING A TEXTURIZED SEAL MEMBER

[75] Inventors: Jeffery E. Daly, Cypress; Robert J. Kotch, Humble, both of Tex.

[73] Assignee: Reed Tool Company, Houston, Tex.

[21] Appl. No.: 649,646

[22] Filed: Sep. 12, 1984

[51] Int. Cl.⁴ .................. F16C 33/74; E21B 10/22; F16J 9/00

[52] U.S. Cl. ........................ 384/94; 384/152; 384/489; 175/371; 277/208; 277/215

[58] Field of Search ............ 277/134, 165, 207 R, 277/208, 12, 215, 96, 96.1; 175/371, 372; 384/92, 94, 151, 152, 153, 130, 477, 489

[56] References Cited

U.S. PATENT DOCUMENTS

| | | | |
|---|---|---|---|
| 2,489,715 | 11/1949 | Mark, Jr. et al. | 277/208 X |
| 3,365,247 | 1/1968 | Ferrand | 384/93 |
| 3,586,342 | 11/1968 | Staab | 277/134 |
| 3,765,495 | 10/1973 | Murdoch et al. | 175/371 |
| 3,822,068 | 7/1974 | Litherland | 277/208 |
| 3,973,781 | 8/1976 | Grörich | 384/153 X |
| 4,157,835 | 6/1979 | Kahle et al. | 277/102 |

FOREIGN PATENT DOCUMENTS 2319168  4/1973  Fed. Rep. of Germany .

Primary Examiner—Stuart S. Levy
Assistant Examiner—David Werner
Attorney, Agent, or Firm—Vinson & Elkins

[57] ABSTRACT

A rotary drill bit comprising a bit body having at least one depending leg at its lower end having a generally cylindrical bearing journal, a roller cutter of generally conical shape having a recess therein receiving the journal a bearing system for rotatably mounting the roller cutter on the journal, and a lubrication system for providing lubricant to the bearing system comprising a reservoir of lubricant, passaging in the bit body for fluid communication between the reservoir and the bearing system, and a seal member between the roller cutter and the journal blocking flow of lubricant out of the bit body. The seal member is of annular shape and is held in a seal cavity between the roller cutter or the journal, with an annular engagement face thereof in sealing, sliding frictional engagement with one of the bearing members. The engagement face of the seal member has a surface texture such that, with the seal member compressed against the stated one bearing member, pockets are formed in the face thereof for holding lubricant for lubricating the seal member, yet the face is effective to substantially block leakage past the seal member.

12 Claims, 15 Drawing Figures

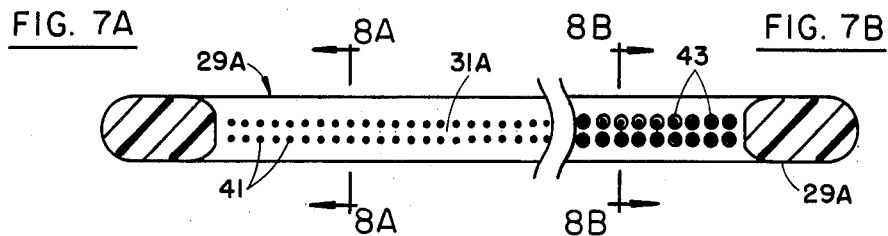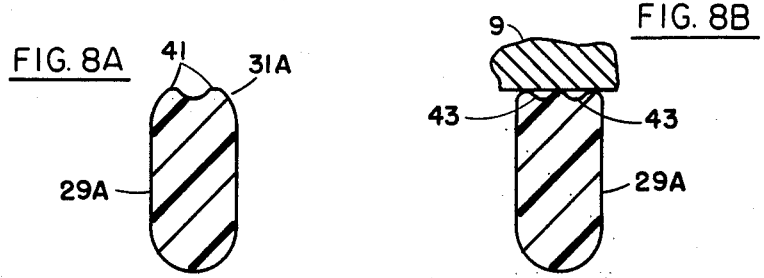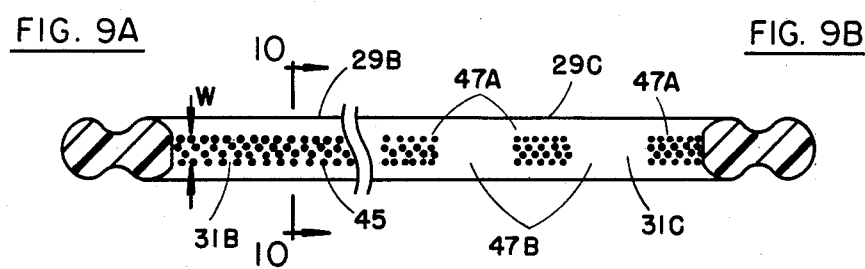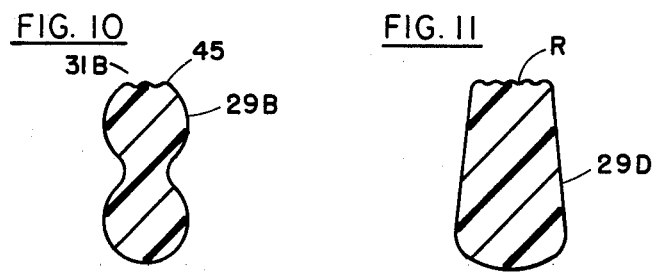

ROLLER CUTTER DRILL BIT HAVING A TEXTURIZED SEAL MEMBER

BACKGROUND OF THE INVENTION

This invention relates to rotary drill bits used to drill oil and gas wells in the earth, and more particularly to rotary drill bits of the so-called sealed bearing roller cutter type.

This invention involves an improvement on the prior art sealed bearing roller cutter drill bit, such as shown for example in U.S. Pat. Nos. 3,397,928 and 3,765,495, comprising a bit body having a threaded pin at its upper end adapted to be detachably secured to a drill string for rotating the drill bit, and three depending legs at its lower end each having a generally cylindrical bearing journal. Conical roller cutters having a recess of generally circular section in the end thereof are rotatably mounted on the bearing journal by bearing means. A lubrication system provides lubricant to each bearing means. The system comprises a reservoir in the bit body holding a supply of lubricant, passaging in the bit body providing fluid communication between the reservoir and the bearing means for flow of lubricant to the bearing means, and a seal member between the roller cutter and the bearing journal for blocking flow of lubricant past the bearing means and out of the bit body. The seal member is a ring of elastomer material carried in an annular groove or recess in the roller cutter and is radially compressed against the bearing journal.

Because of the limited quantity of lubricant in the lubrication system, the seal member must be effective in blocking egress of lubricant from the bit body so as to prevent the bearing from running "dry" and thus destruction of bearing. Similarly, because the drilling fluid surrounding the bit when in a well bore is highly abrasive, the seal member must also be effective in blocking ingress of drilling fluid into the bit body. To make the seal substantially leak-proof, the seal is typically subject to a high degree of radial compression (i.e., 10% or more compression as disclosed in U.S. Pat. No. 3,397,928, and something approaching but not reaching 10% compression as disclosed in U.S. Pat. No. 3,765,495). Such levels of compression are significantly higher than that recommended for other uses of elastomeric sealing rings. Moreover, it is the accepted practice in the industry, to make the face of the seal member which is in sliding, frictional engagement with the bearing journal a smooth, flawless surface.

In this latter regard, each of the competitors in the drill bit industry has developed quality control procedures to ensure that the engaging face of each drill bit seal member is free of surface imperfections. These quality control procedures are based on the "Rubber Manufacturers Association O-Ring Inspection Guide Handbook" and Military Standard (MIL-STD-413B) for Visual Inspection Guide for Elastomeric O-Rings. The inspection procedure of the assignee of this application, for example, requires that the engaging face of the seal member be a smooth, uniform, continuous surface free of all of the fourteen kinds of unacceptable surface imperfections described in MIL-STD-413C, when the seal member is visually examined under 3× magnification. It has been the accepted wisdom in the industry that surface imperfections are highly undesirable in that an imperfection may provide a flow path (or at least a portion of a flow path) for lubricant or drilling fluid leakage. In addition, such surface imperfection could also cause stress concentrations in the highly compressed seal member which may result in tearing of the the seal member due to the high frictional forces on the engagement face of the seal member tending to shear the face from the remainder of the seal member.

Seal members having smooth engagement faces have been generally satisfactory for sealed bearing roller cutter drill bits as evidenced by the fact that such seal members have been the industry standard since the early 1970's. However, in recent years, improvements in drilling equipment technology has enabled drillers to turn drill bits faster so as to deliver more power to the drill bit for higher rates of drilling penetration through the earth's formations, and a problem, described more fully hereinafter, has developed with this seal member.

A modern rotary drill rig can rotate the drill string and thus a roller cutter drill bit at 150 rpm as compared to an older drill rig which could rotate at only 110 rpm. In addition, positive displacement down hole motors with speeds of rotation of up to 500 rmp and down hole turbine motors with speeds of up to 1000 rmp, which had previously been used only with diamond drag drill bits, are not being used to rotate roller cutter type drill bits. Because each roller cutter rotates approximately 1½ times for each rotation of the drill bit body and the length of the circumference of the bearing journal engaged by the seal member increases with drill bit body diameter, seal members (particularly those in large diameter bits) are now subject to high linear speeds, as measured in feet per second, at their engagement faces. For example, in one common application in which a 17½ inch diameter drill bit is run on a turbine motor at 750 rpm, the engagement face of the seal member is subject to a linear speed in excess of 20 feet per second. Such speeds exceed the recommended speed for an O-ring seal member used in even the most ideal conditions, much less in a drill bit in which the seal member is highly compressed, is exposed to highly abrasive material (i.e., the drilling fluid) and to high operating temperatures, and is carried in a bearing member (i.e., the roller cutter) that wobbles and reciprocates, as well as rotates on the bearing journal. With these high speeds of drill bit rotation, the smooth surface seal members have shown a tendency to fail well before the remainder of the drill bit is fully worn.

The reasons for such failure are not fully understood. However, applicants believe that this is due in significant part to an inability of the seal member to adequately hold lubricant to its engagement face, with the result that the engagement face becomes overheated. Excess heat in the seal member causes vulcanization of the seal member's elastomeric material, thereby resulting in the seal member losing its elasticity and hence its ability to remain in sealing engagement with the bearing journal as the roller cutter wobbles. Excess heat thus results in leakage of lubricant and/or drilling fluid past the seal member, and shortly thereafter failure of the bearing and the entire drill bit.

SUMMARY OF THE INVENTION

Among the several objects of this invention may be noted the provision of a sealed bearing roller cutter drill bit having an improved seal member which enables the drill bit to be turned at high speeds yet provides satisfactory seal life; the provision of such a seal member for which less heat is generated at its engaging face than at the engaging face of a conventional seal member; the provision of such a seal member which may be made of harder elastomeric materials than a conventional seal member, and the provision of such a seal member which may be made of an elastomeric material which has less tear strength than the materials used for the conventional seal member.

In general, the rotary drill bit of this invention comprises a bit body having a threaded pin at its upper end adapted to be detachably secured to a drill string for rotating the drill it, and at least one depending leg at its lower end having a generally cylindrical bearing journal, constituting a first bearing member of the bit. The bit further comprises a roller cutter of generally conical shape constituting a second bearing member of the bit, with the roller cutter having a recess therein of generally circular section for receiving the bearing journal. Bearing means rotatably mount the roller cutter on the bearing journal. A lubrication system in the bit provides lubricant to the bearing means. This system comprises a reservoir holding a supply of lubricant, passaging in the bit body providing fluid communication between the reservoir and the bearing means, and seal means in an annular seal cavity between the roller cutter and the bearing journal for blocking flow of lubricant past the bearing means and out of the bit body. The seal means comprises an annular seal member of elastomeric material compressed radially between the bearing members, with an annular engagement face of the seal member in sealing, sliding frictional engagement with said one of the bearing members. The annular engagement face has a surface texture such that with the seal member compressed against said one bearing member a plurality of pockets are formed in the annular emgagement face adapted to hold lubricant for lubricating the seal member, yet the annular engagement face is effective to substantially block leakage past the seal member.

Other objects and features will be in part apparent and in part pointed out hereinafter.

BRIEF DESCRIPTION OF THE DRAWINGS

FIG. 7A is a view similar to FIG. 5 of a second embodiment of the seal member in its uncompressed condition;

FIG. 7B is a view similar to FIG. 7A but with the seal member shown it would appear when compressed against a bearing member, with pockets formed in the engagement face thereof;

FIG. 8A is an enlarged section on line 8A—8A of FIG. 7;

FIG. 8B is an enlarged section on line 8B—8B, with a portion of the bearing member engaged by the seal member being shown;

FIG. 9A is a view similar to FIG. 5 showing a third embodiment of the seal member having a large number of small projections on its engaging face;

FIG. 9B is a view similar to FIG. 9A showing a fourth embodiment of the seal member having an engagement face having alternate segments of texturized surface and smooth surface;

FIG. 10 is an enlarged section on line 10—10 of FIG. 9A; and

FIG. 11 is an enlarged section of a fifth embodiment of the seal member having a generally tapered shape in section and recesses in its engagement face.

Corresponding reference characters indicate corresponding parts throughout the several views of the drawings.

DESCRIPTION OF THE PREFERRED EMBODIMENTS

Figure 1:
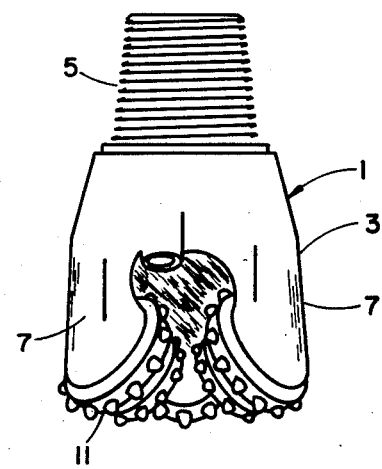
FIG. 1 is an elevation of a rotary drill bit of this invention having a plurality of roller cutters.

Referring to FIG. 1 there is generally indicated at 1 a rotary drill bit of this invention for drilling oil and gas wells in the earth. The drill bit comprises a bit body 3 having a threaded pin 5 at its upper end adapted to be detachably secured to a drill string (not shown) suspended from a drill rig (not shown). The drill string is used to rotate the drill bit in the well bore and to deliver drilling fluid under pressure to the drill bit. The drilling fluid is pumped by fluid circulation pumps (not shown) at the drill rig down the passage in the drill string, through nozzles in the drill bit to clean the well bore bottom and back up to the drill rig via the annulus between the drill string and the side of the well bore to remove formation cuttings. At its lower end, the bit body has a plurality of legs 7 each having a generally cylindrical bearing journal 9, constituting a first bearing member of the bit. The drill bit further comprises a plurality of generally frustoconical roller cutters 11, one for each bearing journal. These roller cutters constitute second bearing members of the drill bit.

Figure 2:
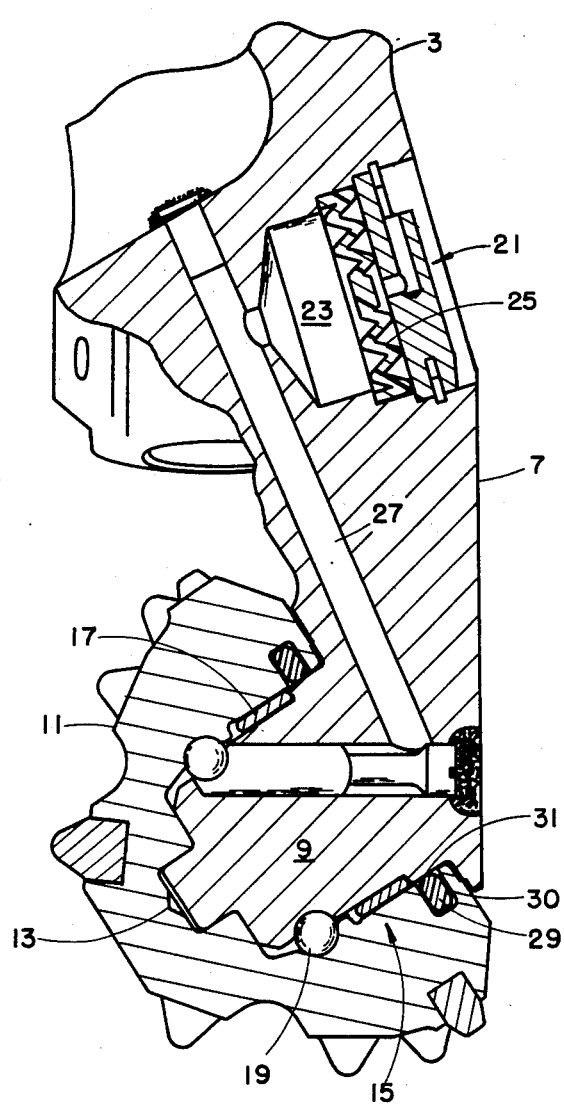
FIG. 2 is an enlarged partial vertical section of the bit of FIG. 1 showing one of the roller cutters rotatably mounted on a bearing journal with a seal member therebetween.
Figure 3:
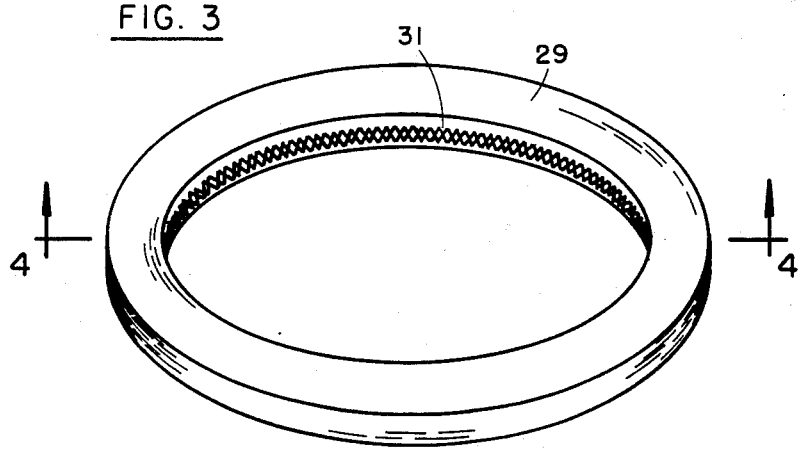
FIG. 3 is an enlarged perspective of the seal member showing its texturized engagement face.
Figure 5:
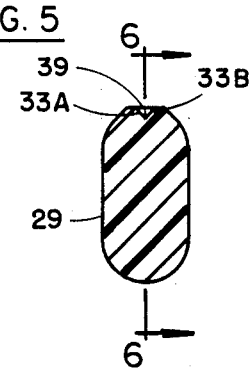
FIG. 5 is an enlarged section of the seal member on line 5—5 of FIG. 4 showing a pocket at the engagement face thereof for holding lubricant.
Figure 6:
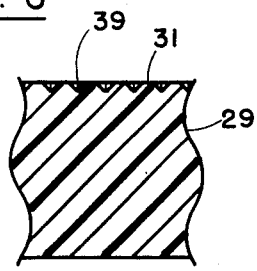
FIG. 6 is a partial section of the seal member on line 6—6 of FIG. 5.

As best illustrated in FIG. 2, each roller cutter 11 has a recess 13 therein of generally circular section for receiving the respective bearing journal 9. Bearing means designated generally at 15 such as bushing 17 for supporting generally vertical loads on the roller cutter and ball bearings 19 for holding the roller cutter on the journal, rotatably mount the roller cutter on the journal. A lubrication system designated generally at 21 in the bit body 3 provides lubricant to the bearing means 15. This system comprises a reservoir 23 of lubricant formed in the side of the bit body and closed by a pressure compensating diaphragm 25 for effecting a balancing of fluid pressure between the drilling fluid outside the bit and the lubricant inside the bit, passaging 27 extending down from the reservoir to the surface of the bearing journal 9 for flow of lubricant to the bearing means, and seal means 29 between the roller cutter and the bearing journal for blocking flow of lubricant past the bearing means and out of the bit body. The seal means comprises an annular seal member of elastomeric material held in an annular recess or seal cavity 30 in the roller cutter in sealing relationship therewith. The seal member is compressed radially against the bearing journal 9 and has an annular engagement face 31 in sealing, sliding frictional engagement with the bearing journal.

As illustrated in FIGS. 3-6, the annular engagement face 31 of the seal member presents a roughened or texturized surface. More particularly, the engaging face has two sets of generally parallel ridges or projections, one set 33A being angled in one direction relative to the longitudinal centerline 35 of the seal member and the other set 33 B being angled in the opposite direction, with the sets of ridges intersecting each other generally at the central radial plane 37 of the seal member. This pattern of ridges forms a plurality of generally diamond shaped recesses or depressions in side-by-side relationship around the annular engagement face 31 of the seal member. With the seal member radially compressed on the bearing journal, the ridges and recesses form, together with the bearing member, a plurality of closed pockets 39 for holding lubricant. It is important to note, that at the same time, this annular engagement face has been found to be effective in substantially blocking flow of lubricant past the seal member out of the bit body, as well as, blocking flow of drilling fluid from the annulus into the bit body.

Figure 4:
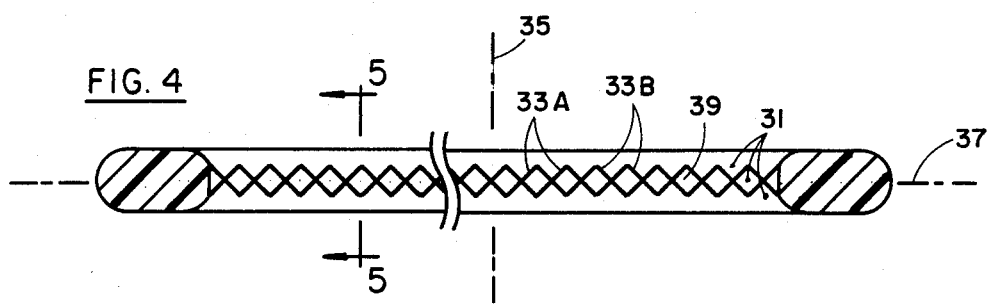
FIG. 4 is a central section of the seal member on line 4—4 of FIG. 3.
Figure 4A:
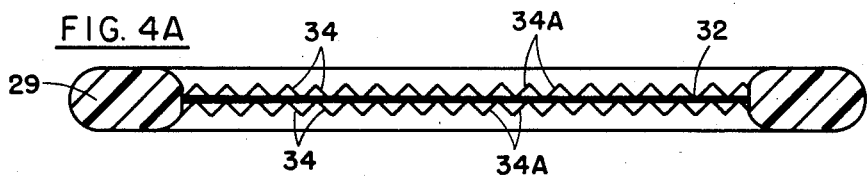
FIG. 4A is a view similar to FIG. 4 showing an alternate ridge design.

A similar pattern of ridges is shown in FIG. 4A. In this arrangement the ridges, 34 and 34A, do not intersect in the central radiaal plane of the seal member, but rather intersect a continuous circumferential ridge, 32. This arrangement functions in a manner similar to the seal member in FIG. 4 and can facilitate manufacture.

By holding lubricant at the frictional engagement surface of the seal member and the bearing journal, the seal member 29 of this invention provides a lower coefficient of friction and lower heat generation than the conventional smooth surface seal member. These properties enable the seal member to be made of harder elastomeric material than the conventional smooth surface seal member. Harder elastomeric seal material is desirable because such material offers greater wear resistance than softer materials. However, at the same time, harder elastomeric seal material requires greater radial compressive forces for an effective seal and thus causes greater wear of the engaging surface of the bearing journal than softer material. Thus, the hardness of the seal member must be chosen so as to balance the wear on the seal member and the wear on the bearing journal so as to provide the greatest overall life in the seal assembly. For conventional smooth surface seal members, the greatest overall seal assembly life is provided when the hardness of the elastomeric material is as low as approximately 70 durometer (shore A). In contrast, because the seal member 29 of this inventin offers a reduced coefficient of friction and thus lower wear on the bearing journal, the seal member 29, may be significantly harder than the conventional seal member (e.g., as hard as 80 durometer or more), which offers significantly greater overall seal assembly life.

The reaction in the coefficient of friction provided by the seal member 29 of this invention also results in a reduction in the shear forces applied to the engagement face of the seal member. This enables the seal member to be made of an elastomeric material having relatively low tensile strength and tear strength and thus enables the other properties necessary for an effective seal (such as resistance to thermal deterioration and abrasion resistance), to be emphasized in selecting an appropriate elastomeric material. Conventional smooth surface seal members are typically formed of a butadiene acrylonitide rubber (Buna N), which has not only satisfactory thermal deterioration and abrasion resistance but also relatively high tensile and tear strength. In contrast, the seal member of this invention may be made from a fluoroelastomer, such as that sold under the tradename VITON by the DuPont Chemical Company of Wilmington, Del., which has better thermal deterioration and abrasion resistance than Buna N but less tensile and tear strength than Buna N. Fluoroelastomer material is particularly well suited for a seal member in a drill bit for drilling well bores in high temperature formation. Such formations are encountered in drilling geothermal wells and in drilling extremely deep holes, in that the formation temperature increases with drilling depth.

Referring to FIGS. 7A and 8A, there is generally indicated at 29A a second embodiment of the seal member which is similar to above-described seal member 29 except that its annular engaging face 31A has a plurality of projections 41 arranged in two parallel rows around the annular engagement face of the seal members. Each projection is so sized and spaced from the adjacent projections that with the seal member 29A compressed radially against the bearing journal 9, annular closed pockets 43 are formed in the engagement face of the seal member around the projections (see FIG. 7B). As shown in FIG. 8B, there are no fluid communication channels between adjacent annular recesses 43 for flow (i.e., leakage) of lubricant or drilling fluid past the seal member.

A third embodiment of the seal member 29B is illustrated at in FIGS. 9A and 10. This seal member is similar to the seal member 29A of the second embodiment except that it has projections 45 on its engagement face 31B which are smaller than the projections 41 both in their cross-sectional area and their projecting height, and are randomly distributed over the annular engagement face 31B of the seal member over the entire length thereof. More particularly, the projections are so sized that with the seal member compressed against the bearing journal 9 the diameter of the annular recesses formed around the projections 45 is less than one-third the width W of the annular engagement face 31B. Because the projections are randomly distributed, any given recess may be in fluid communication with one or more adjacent recesses and thus would not form a closed pocket. Nonetheless, the seal member is substantially leak-proof because the flow path (i.e., path for leakage) for lubricant or drilling fluid across the engagement face 31B of the seal would be of such small cross-sectional area as to prevent significant flow. FIGS. 9A and 10 also show the seal member 29B to be of generally hour glass shape in section for enabling the seal member to be more readily deformed than the rectangular section seal members shown in FIGS. 1-8.

A fourth embodiment of the seal member 29C of this invention similar to the third embodiment 29B is shown in FIG. 9B. The engagement face 31C of this seal member is divided into a plurality of segments 47A and 47B. Every other segment 47A has projections thereon, with the remaining segments 47B having a smooth surface.

Lastly, a fifth embodiment of the seal member 29D is shown at in FIG. 11. In contrast to the above-described embodiments of the seal members which are formed as by conventional injection or compression molding processes so as to have projections on their engagement faces, this seal member 29D is formed so as to have recesses R in its engagement face. Moreover, the seal member 29D is of a tapered shape in section for enabling the seal member to be more readily deformed than the seal members 29 and 29A of rectangular section.

It will be observed from the foregoing that all of the above-described embodiments of the seal member, when compressed against the bearing journal, form pockets in their engaging faces for holding lubricant, yet are effective to substantially block flow of lubricant and drilling fluid past the seal member.

The seal member of this invention thus provides not only an effective block to leakage but also a lower coefficient of friction than that for a conventional smooth surface seal member for lower heat generation. Accordingly, as compared with the conventional smooth surface seals, the seal member of this invention offers longer life, particularly when used in bits rotated at high speeds and in bits used to drill in high temperature formations.

While the seal members have been shown in the FIGS. and described above as being of a generally elongated shape in section, it is contemplated that they could be other sectional shapes including square, rectangular or circular. In the case of the circular shape the entire outer surface of the seal member would be texturized. In addition, while the annular face 31 of the seal member in engagement with the bearing journal is shown and described as being texturized it is contemplated that the face of the annular face in engagement with the roller cutter could be texturized in addition to or in lieu of face 31.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A rotary drill bit for use in drilling a well bore comprising:
    a bit body having a threaded pin at its upper end adapted to be detachably secured to a drill string for rotating the drill bit, and at least one depending leg at its lower end having a generally cylindrical bearing journal, constituting a first bearing member of the bit;
    a roller cutter of generally conical shape constituting a second bearing member of the bit, the roller cutter having a recess therein of generally circular section for receiving the bearing journal;
    bearing menas for rotatably mounting the roller cutter on the bearing journal; and
    a lubrication system for providing lubricant to the bearing means comprising a reservoir holding a supply of lubricant, passaging in the bit body providing fluid communication between the reservoir and the bearing means, and seal means in an annular seal cavity between the roller cutter and the bearing journal for blocking flow of lubricant past the bearing means and out of the bit body, and for blocking flow of drilling fluid past the seal means and into the bit body;
    said seal means comprising an annular seal member of elastomeric material compressed radially between said bearing members and having a circumferentially continuous annular engagement face in sealing, sliding frictional engagement with one of the bearing members, said annular engagement face having a surface texture defining a pattern of alternating depressions and projections to form a plurality of radially compressed pockets to hold lubricant therein against said one bearing member, said pattern of alternating depressions and projections on said surface texture being arranged and constructed to substantially block the flow of lubricant past said seal member and out of the bit body, and to substantially block the flow of drilling fluid past said seal member inwardly to said bearing means and inside the bit body.

2. A rotary drill bit as set forth in claim 1 wherein the seal member at its annular engagement has a plurality of projection arranged in such a pattern as to form with said one bearing member a plurality of closed pockets for holding lubricant.

3. A rotary drill bit as set forth in claim 2 wherein said closed pockets are in side-by-side relationship around the annular engagement face.

4. A rotary drill bit as set forth in claim 2 wherein said pattern of projection is symmetrical with respect to the central radial plane of the seal member.

5. A rotary drill bit as set forth in claim 1 wherein the seal member at its annular engagement face has a plurality of projections arranged in such a pattern as to form with said one bearing member a plurality of generally annular pockets in the engagement face.

6. A rotary drill bit as set forth in claim 5 wherein the projections are so sized and so positioned relative to each other than the annular pockets formed in the annular engagement face are closed pockets.

7. A rotary drill bit as set forth in claim 5 wherein each projection is of such projecting height that the diameter of the respective annular recess is less than one-third the width of the annular engagement face.

8. A rotary drill bit as set forth in claim 7 wherein said projections are randomly distributed over at least portions of the annular engagement face.

9. A rotary drill bit as set forth in claim 1 wherein the seal member is formed of a fluoroelastomeric material.

10. In a rotary drill bit having a bearing journal thereon forming a first bearing member, a roller cutter forming a second bearing member on the bearing journal, bearing means mounting the roller cutter for rotation on the bearing journal, and a lubrication system for providing lubricant to the bearing means including fluid pressure compensating means for effecting a balancing of fluid pressure between the drilling fluid outside the bit and the lubricant inside the bit;
    an improved O-ring type annular seal member mounted adjacent said bearing means between the roller cutter and bearing journal, said seal member being exposed to liquid drilling fluid on one side thereof and to liquid lubricant on the other side thereof, said seal member being formed of an elastomeric material and having opposed annular engagement faces thereof forming circumferentially continuous sealing surfaces compressed radially in sealing relation between the roller cutter and bearing journal which form the bearing members;
    one of said annular engagement faces having a roughened surface texture about substantially its entire periphery and being in sliding frictional engagement with one of the bearing members, said roughened surface texture defining a plurality of projections and intervening recesses arranged in a pattern to form a plurality of pockets radially compressed against said one bearing member to retain lubricant therein, said pattern of recesses and projections on said roughened surface texture being arranged and constructed to substantially block the flow of lubricant past said seal member outwardly of said bearing means, and to substantially block the flow of drilling fluid past said seal member inwardly to said bearing means.

11. In a rotary drill bit having a bearing journal defining one bearing member, a roller cutter on the bearing journal defining a second bearing member, bearing means mounting the roller cutter for rotation on the bearing journal, and a lubrication system for providing lubricant to the bearing means including pressure compensation means to effect balancing of fluid pressure differentials between the drilling fluid outside the bit and the lubricant inside the bit; the improvement of:

an O-ring type annular seal member having inner and outer radial sealing faces compressed between and in contact with opposed bearing surfaces on the roller cutter and bearing journal to form circumferentially continuous sealing surfaces, said seal member being exposed to liquid drilling fluid outside the bit on one side thereof and to liquid lubricant inside the bit on an opposite side thereof:

one of said sealing faces having pockets directly adjacent its circumferetially continuous sealing surface for retaining lubricant therein against one of said bearing members, said pockets defining a plurality of projections and intervening recesses arranged in a pattern to block the flow of lubricant inside the bit past said seal member outwardly of said bearing means, and to block the flow of drilling fluid outside the bit past said seal member inwardly to said bearing means under fluid pressure differentials between the drilling fluid and lubricant encountered during normal operation of the drill bit.

12. In a rotary drill bit as set forth in claim 11 wherein said seal member fits within an annular recess in said roller cutter and is compressed radially against said bearing journal and the bottom of said annular recess.

* * * * *